Dec. 23, 1969         D. D. HERR         3,485,314
ARTICLE CARRYING VEHICLE WITH OPTIONAL
STOWABLE RIDING ATTACHMENT
Filed May 24, 1967                 3 Sheets-Sheet 1

INVENTOR
DAVID D. HERR
BY Patrick J. Henry
ATTORNEY

INVENTOR
DAVID D. HERR
BY
ATTORNEY

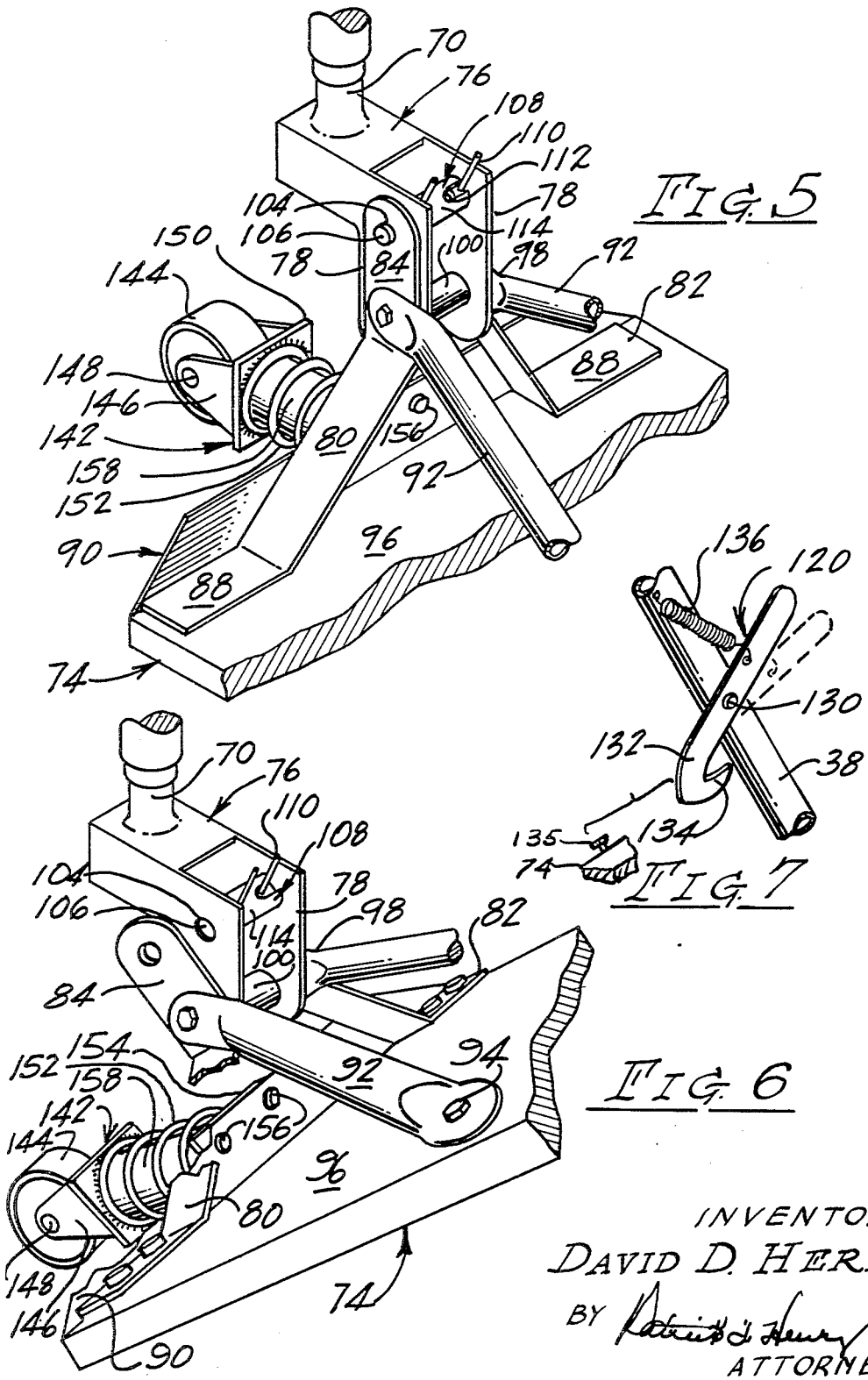

United States Patent Office 3,485,314
Patented Dec. 23, 1969

3,485,314
ARTICLE CARRYING VEHICLE WITH OPTIONAL
STOWABLE RIDING ATTACHMENT
David D. Herr, De Kalb County, near Atlanta, Ga.
(1017 Oxford Road NE., Atlanta, Ga. 30306)
Filed May 24, 1967, Ser. No. 640,951
Int. Cl. B62d 51/04, 63/00, 13/00
U.S. Cl. 180—19
5 Claims

ABSTRACT OF THE DISCLOSURE

A power-driven tractor with an article container mounted thereon and having handle bars and there being a foldable and stowable trailer attachment on which the operator may stand so that the vehicle can be used to transport both the articles and the operator over smooth terrain but can be used as a walk-behind vehicle by the operator to transport only the articles while the operator holds the handles and walks behind. The vehicle is especially applicable and useful by hikers, campers and the like so as to make better time across changeable terrain.

BACKGROUND OF THE INVENTION

Field of the invention

A land vehicle with wheels having a retractable ground support also with wheels on it and also possibly articulated vehicles having retractable portions as well as motor vehicles steered by a walking attendant.

Description of the prior art

Prior art devices like those in U.S. Patents 2,880,034; 2,919,756; 3,190,672, disclose power driven vehicles such as lawn mowers which have separate attachments on which the occupant sits while he steers the vehicle. Such arrangements either are permanent attachments to a power unit or else are detachable sulky arrangements and the like which are intended to remain in place once attached. The prior art does not provide a conveniently arranged vehicle which his occupant steered and has some sort of article carrying support thereon whereby the occupant may stand behind and steer the vehicle over rough and difficult terrain, when it is necessary to keep up with others who are walking, and being readily convertible by easily bringing the stored occupant support into position with wheels on the ground providing a trailer attached to the power unit which supports the occupant who steers the power unit in the same manner as when walking. There is a need in certain instances of changeable terrain for hikers, campers, Boy Scouts and the like, for a vehicle which will carry articles and other items while the operator walks along the same as the other walkers but which may readily be placed into action to give the operator a place to stand to increase speed to carry the occupant as well as the articles as fast as possible to the destination. Such a vehicle would be of great advantage in case of emergency if it were necessary either to go for supplies or the like or to remove an injured person as rapidly as possible to treatment.

SUMMARY OF INVENTION

The tractor or pulling unit of the present invention may resemble a two-wheel tractor of the sort which is common in garden tractors and similar hand-steered tractor devices which has been modified to support a large container on the top and may be constructed from plywood or the like having a closure covering not only the interior of the compartment but also covering the engine part of the tractor to protect it from rain, dust and other things and which also will provide heat inside the compartment in case an injured party is being moved in cold weather. A pair of converging, tractor-like steering handles project from the rear of the tractor unit. A flat, lightweight trailer unit is connected by means of an articulated connection to the frame of the tractor and has a fastener member in the form of a retractable bolt insertable in matching holes to retain the entire trailer in raised, inoperative position, so that the operator can walk along behind the tractor in the usual manner, guiding and steering with the hands and maintaining speed according to the desired walking pace. The articulated trailer has one or more wheels upon which part of it beyond the articulated connection rests so that when it is desired to make maximum speed with minimum physical effort the trailer is lowered into ground engaging position and the occupant stands on the flat trailer and steers the vehicle in the same manner as when walking on the ground. The container or cargo box is supported in front of the handles in balanced condition over the tractor wheels. The arrangement is simple in construction, is quick and easily converted and is quite rugged without any excess weight. The cost would be relatively small especially since it is adaptable to using commercially available components and the operation is very economical. Compared with walking over certain terrains the speed will be considerably greater for a much longer period of time uninterrupted by occasional rest periods.

BRIEF DESCRIPTION OF THE DRAWINGS

Other and further objects and advantages of this invention will appear more fully from reading the following specification taken in conjunction with the accompanying drawings, in which:

FIG. 5 is an enlarged perspective view of the connection between the trailer and the tractor with the trailer latched in down, operative position.

FIG. 6 is an enlarged perspective view similar to FIG. 5 with the connection unlatched and the trailer partly raised to retracted, stored and inoperative position.

DESCRIPTION OF A PREFERRED EMBODIMENT

Figure 1:
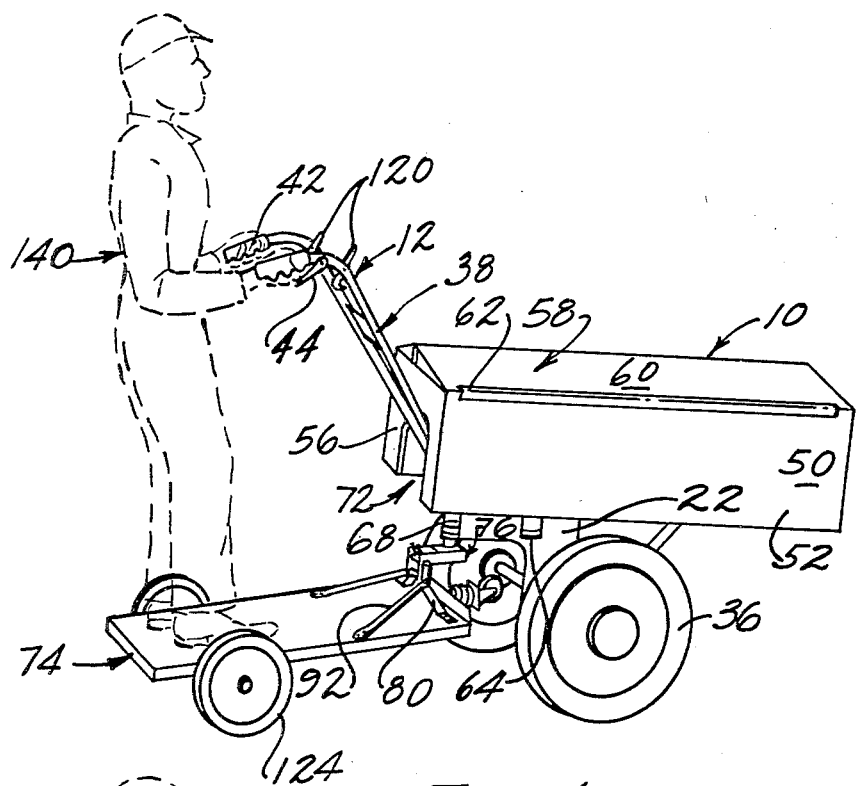
FIG. 1 is a perspective view of the present invention with the occupant riding the retractable trailer.

The entire vehicle is designated generally by reference numeral 10 and comprises a tractor or pulling unit referred to generally by reference numeral 12 and which has a motor 14 of a conventional two or four cycle internal combustion engine type commonly found on lawnmowers and garden tractors and which motor includes a gasoline tank 16, rope-winding starter pulley 18, muffler 20 all mounted with a motor crank case unit 22 cast integrally with a transmission housing 24 in which is a conventional power transmission unit 26 receiving power from the engine 14 from a power shaft 28 through a worm gear drive 30 to a pair of drive gears 32 connected to an axle 34 on which is mounted respectively on opposite sides a ground engaging, rubber-tired wheel 36 of the type commonly found in garden tractors and tilling devices.

The foregoing engine, transmission drive, wheels and the like are of conventional construction and varies from one implement to another and any similar unit may be used in constructing the present invention. Also, commonly found on such tractors is a pair of diverging handlebar members 38 connected by bolts 40 to the engine crank case 22 and having a pair of handle grips 42 adjacent conventional control levers 44, there being a gas control lever and if desired a choke control lever as well as a conventional braking device (not shown).

Figure 3:
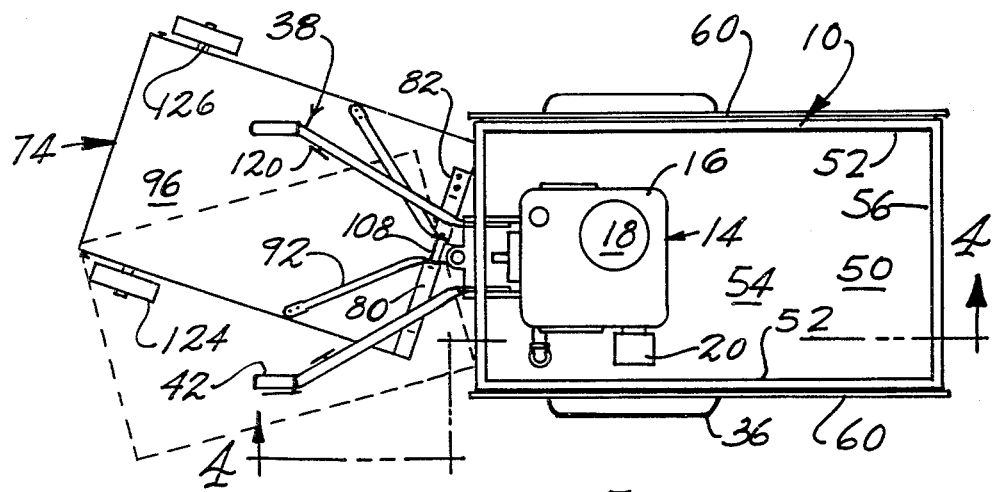
FIG. 3 is a top plan view of the machine shown in FIG. 1 without the operator and illustrating in dotted lines the articulation of the trailer.
Figure 4:
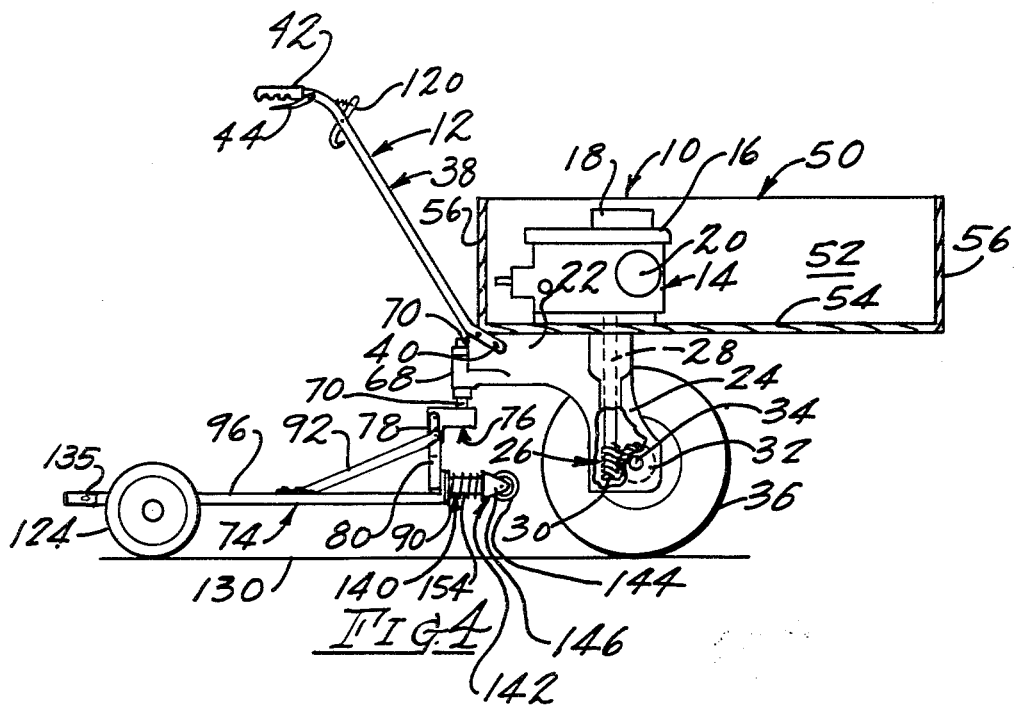
FIG. 4 is a cross-section view of the machine taken along lines 4—4 in FIG. 3.

A cargo tray or container designated generally by reference numeral 50 comprises spaced sides 52 which may be of plywood or any other similar material, a bottom 54 and end walls 56 connected together and suitably attached to provide a box-like structure on which is mounted a closure designated generally by reference numeral 58 and comprising a pair of hinged lid members 60 swingable in opposite directions about the hinges 62 to provide access to the interior of the cargo container 50. The bottom 54 is fitted about the engine case 22 and partly rests and is attached thereto, as shown in FIGS. 3 and 4, to place the upper part of the engine 14 inside the cargo container 50. Muffler 20 exhausts into this container and out through an external exhaust connection 64 thereby providing exhaust heat through the outlet 64 inside the container 50. Also, the starting pulley 18 and gasoline tank 16 as well as other parts of the engine are located inside of the cargo container 50 covered by the closure 58 and protected from the elements.

The rearward part of the transmission housing 22 is provided with a journal 68 having a pin 70 mounted suitably in bearings therein and the diverging handle members 38 extend through a cut out portion 72 of the end wall 56 near the handles 38.

The trailer attachment designated generally by reference numeral 74 is connected to the pin 70 in the journal 68. The details of the connection will be apparent from the figures of the drawings especially FIGS. 5 and 6 wherein it is seen that pin 70 is welded or otherwise attached to a support bracket 76 which includes spaced, depending, open support members 78 to which is pivotally attached a pair of metal support arms 80 bent to provide coextensive and sometimes overlapping members 84 along the spaced members 78 and also at the opposite end of members 80, 82 flat attachment members 88 which are welded or otherwise attached to the frame 90 of the trailer 74. Diagonal support rods 92 have one end 94 thereof attached at opposite points on the trailer platform 96 which may be constructed from wood, plywood or other material, and the other end 98 of each thereof flattened and connected to a pin 100 extending through the members 84 and through the spaced members 78 thereby attaching the trailer 74 to the bracket member 76 and pivotally thereon on the pivot pin 100. Each of the spaced members 84 has the upper portion thereof movable with respect to the corresponding members 78 and each member 84 has a hole 104 therein through which is inserted a retractable pin 106, there being two such pins one on each side of a retractable latching device 108 having pin retracting actuators 110 operable against coilsprings 112 inside a housing 114 so that when the pins 106 are extended under spring pressure through the openings in members 84 the trailer 74 is securely attached in downward position and the trailer 74 may be raised to the position shown in FIG. 2 by grasping each of the pin actuators 110 between the thumb and forefinger of one hand and retracting both of the pins 106 simultaneously and with the other hand swinging the platform 96 of the trailer 74 into the upward position in FIG. 2 and latching same at this position by means of a pair of spaced pivoted latches 120, there being one on each of the respective handles 38.

The rearward portion of platform 74 is provided with a pair of spaced wheels 124 mounted on a transverse shaft 126 extended transversely across the platform 96 and secured thereto. As seen in FIGS. 1, 3 and 4, whenever the trailer 74 is in downward, operative position, the wheels 124 rest on the ground 130 in alignment with the larger tractor wheels 36 to travel therebehind.

As seen in FIG. 3, the trailer 74 is at least partly articulated about the pin 70 in journal 68 and will track behind the tractor wheels 36 with the operator standing on the platform 96 as illustrated in FIG. 1. In this position, the tractor may be run its full speed depending upon the terrain and the operator rides on the trailer 74. On the other hand, if the terrain becomes very rugged or it is necessary to slow down, or the cargo container 50 is loaded heavily or for any other reason, the operator may walk along behind the wheels 36 guiding the device 10 by means of the handlebars 12 in the usual fashion of following and guiding a garden tractor. The motor is controlled as to speed by means of the controls 44 readily accessible to the hand of the operator who is designated in dotted lines by reference numeral 140.

Figure 2:
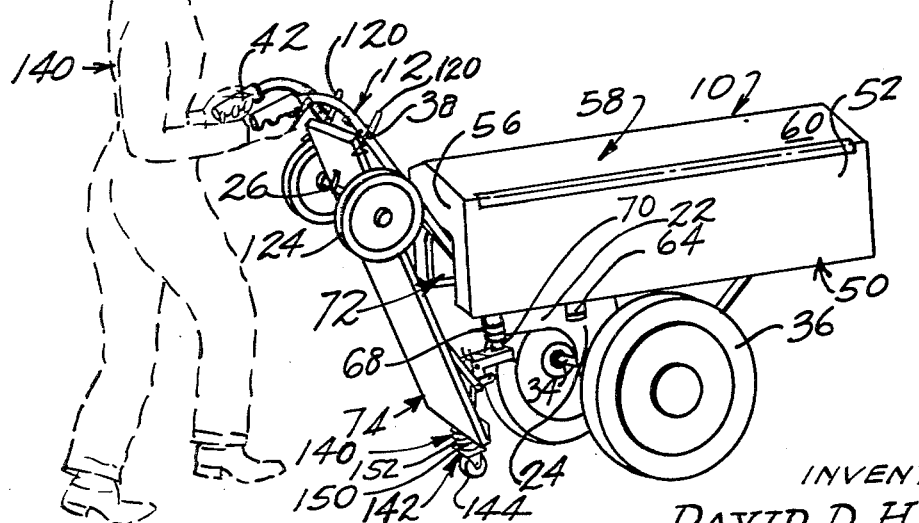
FIG. 2 is a view similar to FIG. 1 with the trailer moved to inoperative, secured and stored position and with the operator walking behind the machine.

Depending upon the relative size of the pin 106 in the respective openings in members 78 and 84, the trailer 74 may have a limited amount of movement at the connection at pin 106 to allow some dropping of the front portion of the platform 96 in rough terrain thereby at times tending to absorb some of the bumps. On the other hand, it is possible to make the connection between the pin 106 and the corresponding holes very tight and to reduce or substantially eliminate any motion in this direction. With any sort of satisfactory terrain, the operator 140 may ride by standing on the platform 96 and travel upwards of ten miles or more an hour but when the terrain gets too rough, it takes only a few seconds to convert the device 10 to a two-wheel tractor with the trailer 74 latched out of the way in place as shown in FIG. 2 until it is needed.

Latches 120 are pivoted on pins 130 mounted on respective handlebar members 38 and each latch 120 comprises a latch member 132 each having a latch member portion 134 offset to hook around a projecting latch pin 135 on each side of the edge of the platform 96. Latch members 132 are each latched by pressure into place by means of a respective coil spring 136 having one end connected to the handlebar 38 and the other end to a point spaced from the pivot 130. This provides positive, strong latching of the platform 96 in up position to prevent accidental dis-engagement during traveling over rough terrain.

An optional, third wheel arrangement 140 is provided at the end of the platform 96 adjacent the trailer attachment 74. Wheel arrangement 140 comprises a caster wheel assembly 142 having a caster wheel 144 in a bracket 146 having a caster pin 148 mounted on a plate 150 which is attached by welding or brazing or otherwise to one end of a coil spring 152 of heavy, strong construction. The other end of coil spring 152 is welded or otherwise attached to a metal plate 154 which is attached to the edge of a platform 96 by bolts 156. A metal sleeve 158 is positioned inside coil spring 152 to limit the flexing thereof and to limit the compression of spring 152. As seen in FIG. 2, wheel 144 contacts the ground in certain positions of the machine 10 when the operator permits the handlebars 38 to drop low enough for the wheel 144 to contact the ground. Thus, the operator may transfer some of the load to the third wheel which also will bounce, at times, in rough terrain and absorb some of the shock of the machine 10, especially if a heavy load is being carried. If the operator gets tired he can permit the load to rest on the third wheel 144 at the back of the two main wheels 36.

While I have shown and described a particular embodiment of my invention together with suggested use thereof and designated in places certain parts, this is by way of illustration only and does not constitute any sort of limitation on the scope of my invention since various alterations, changes, modifications, eliminations, additions, substitutions, omissions, deviations, and departures may be made in the device described without departing from the scope of my invention.

I claim:
1. In a trailer tractor vehicle for operation either by a riding or walking operator:
(a) a tractor frame having a power means thereon and a drive transmission driven from said power means,
(b) movable ground engaging drive means on said tractor driven from said power unit to propel said tractor across the ground,
(c) a trailer attachment on said tractor and a trailer attached thereto providing a place on which the operator may stand,
(d) ground engaging trailer support means mounted on said trailer, said trailer being movable from a ground supported position on said trailer support means in which said operator stands on said trailer and rides thereon, and said trailer being movable to a non-operative position, said trailer support means being near the end of said trailer remote from said trailer attachment,
(e) manually operable retaining means releasably retaining said trailer in inoperative position on said tractor in which position said operator walks on the ground behind said tractor and guides same,
(f) handle means on said tractor held in the hands of the operator to guide and operate said tractor.
(g) resiliently mounted ground engaging support means intermediate said trailer suport means and said movable ground engaging drive means, and which at times may be out of contact with the ground when said trailer is operative and said trailer support means near the other end is in contact with the ground, and at times may be brought into contact as when the operator tilts the tractor, to provide stability and additional resilient support,
(h) said trailer attachment comprising a horizontal pivot about which said trailer may be pivoted from operative to inoperative position, and said retaining means comprising a retractable member engageable selectively to lock said pivot from operation.

2. The device claimed in claim 1, wherein there is a cargo carrier having a flat bottom and a portion of said bottom is cut out and said engine extends therethrough.

3. The device claimed in claim 2, wherein said handles on said tractor extend upwardly behind said cargo carrier, and a portion of one end of said cargo carrier is cut out to accommodate said handles.

4. The device in claim 1, wherein: said support wheel is a caster wheel resiliently mounted so that when said vehicle is moving over rough ground and said operator is holding said handles with said caster wheel out of contact with the ground, said wheel can bump the ground and absorb the shock by its resilient mounting.

5. The device in claim 4, wherein: said resilient mounting of said wheel comprises a heavy coil spring having one end attached to the trailer and the other end attached to the wheel, and means limiting the flexing of said spring.

References Cited

UNITED STATES PATENTS

| | | | |
|---|---|---|---|
| 1,565,719 | 12/1925 | Dunkley | 180—11 |
| 2,354,576 | 7/1944 | Clark. | |
| 2,408,937 | 10/1946 | Lendermon | 180—19 |
| 2,737,734 | 3/1956 | Barras | 172—433 X |
| 3,190,672 | 6/1965 | Swanson et al. | 280—32.7 |

FOREIGN PATENTS

| | | |
|---|---|---|
| 139,496 | 11/1934 | Austria. |
| 739,482 | 10/1932 | France. |

LEO FRIAGLIA, Primary Examiner

JOHN A. PEKAR, Assistant Examiner

U.S. Cl. X.R.

180—11, 14; 280—32.7, 415